Jan. 13, 1953     I. WILLIAMS     2,625,466
PROCESS AND APPARATUS FOR MAKING CARBON BLACK
Filed Feb. 17, 1950     2 SHEETS—SHEET 1
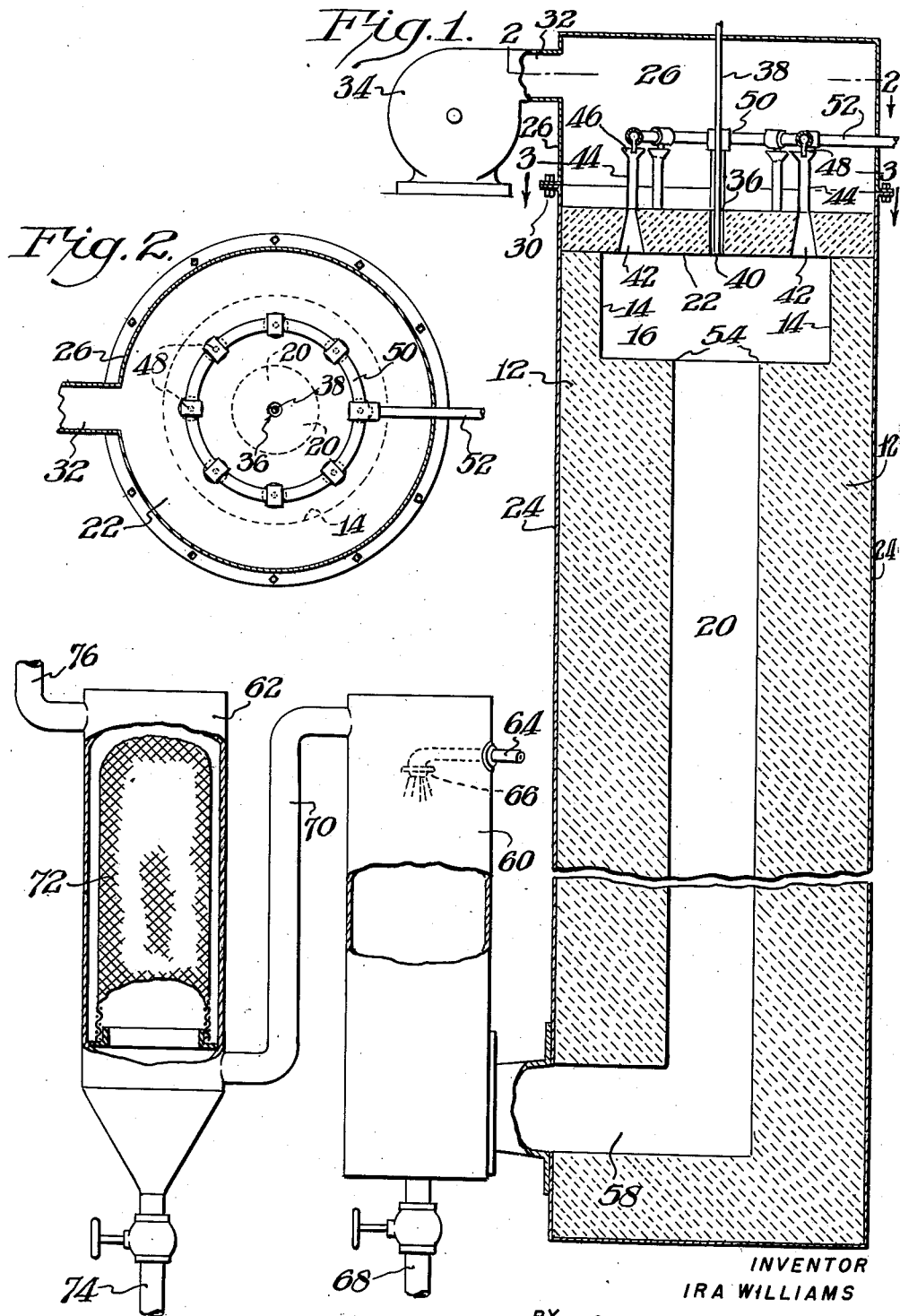
INVENTOR
IRA WILLIAMS
BY Edwin C. Woodhouse
ATTORNEY Jan. 13, 1953        I. WILLIAMS        2,625,466
PROCESS AND APPARATUS FOR MAKING CARBON BLACK
Filed Feb. 17, 1950        2 SHEETS—SHEET 2
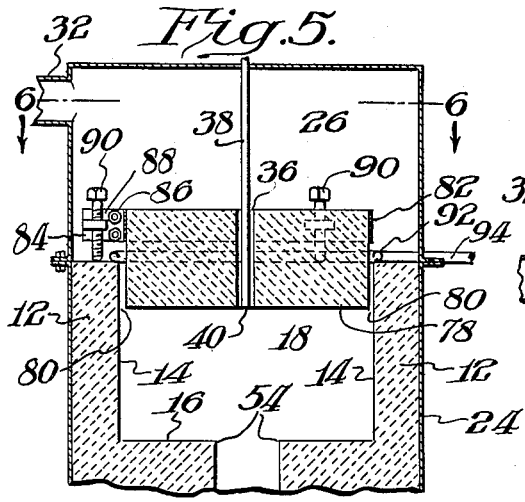
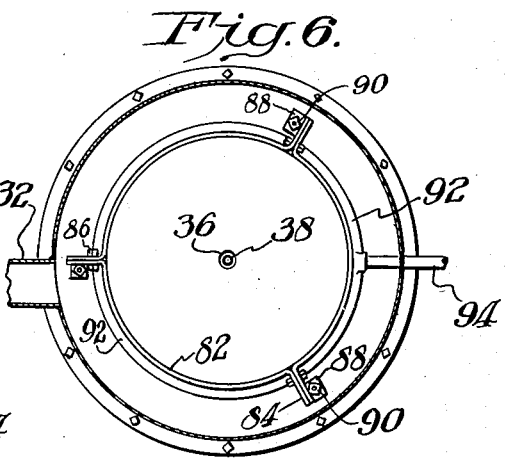
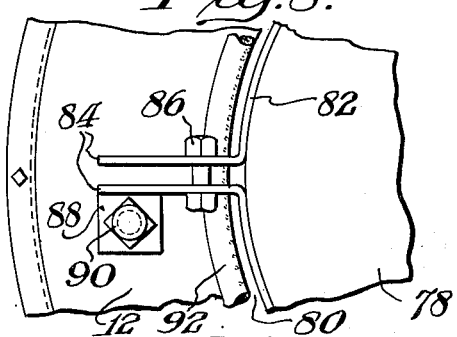
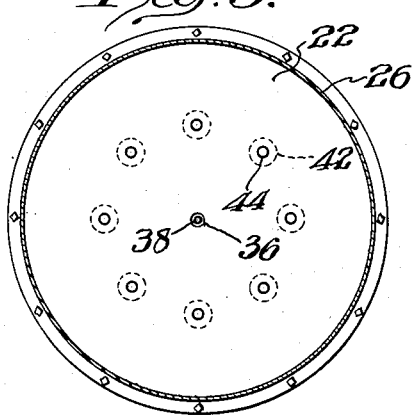
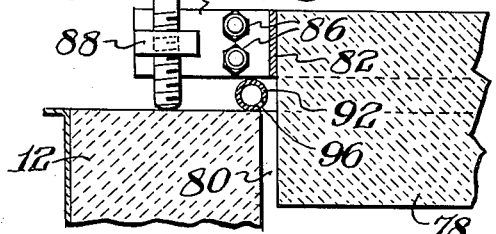
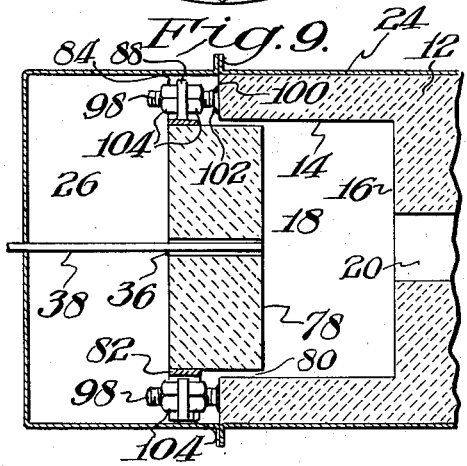
INVENTOR
IRA WILLIAMS
BY Edwin C. Woodhouse
ATTORNEY Patented Jan. 13, 1953

2,625,466

UNITED STATES PATENT OFFICE 2,625,466

PROCESS AND APPARATUS FOR MAKING CARBON BLACK

Ira Williams, Borger, Tex., assignor to J. M. Huber Corporation, Locust, N. J., a corporation of New Jersey Application February 17, 1950, Serial No. 144,607

20 Claims. (Cl. 23—209.6)

This invention relates to a process and to apparatus for making carbon black of fine particle size by the thermal decomposition of hydrocarbons.

Carbon black must be of a very fine particle size in order to exhibit the best properties for most purposes and particularly in order to be a satisfactory compounding ingredient for tires. The most satisfactory carbon black has usually been made by the channel process, which comprises burning natural gas in small flames which impinge upon the deposit carbon on channel irons, the carbon being scraped from the channel irons almost as fast as it is formed. Such carbon black is known as channel carbon black and the particles have a diameter of slightly less than 0.1 micron.

A substantial amount of carbon black has been made by the thermal decomposition of hydrocarbons in furnaces. Such carbon black is generally known as furnace carbon black and usually has a particle size ranging from about 0.2 micron upward. Relatively few furnace carbon blacks approach channel carbon black in particle size and such furnace carbon blacks are usually obtained at a considerable sacrifice in yield.

Many different types of furnaces and methods have been employed in the past for producing furnace carbon black. Such furnaces and methods are illustrated by Patent 2,144,971 to Heller et al., Patent 2,368,828 to Hanson et al., Reissue Patent 22,886 to Ayers, Patent 1,807,321 to Miller, and Patent 2,378,055 to Wiegand. Heller et al. employ thin alternate layers of air and gas which burn with a non-turbulent flame and produce relatively coarse carbon black, generally having a particle size exceeding 0.5 micron. Hanson et al. introduce hydrocarbon axially into a cylindrical furnace and introduce air tangentially into such furnace, whereupon the hydrocarbon and air mix, part of the hydrocarbon burns and produces heat to decompose the rest of the hydrocarbon to carbon. Ayers sprays oil axially into the end of a cylindrical furnace, introducing part of the necessary air as a ring surrounding the oil spray, and introducing the remainder of the air tangentially of the furnace so that it follows the walls of the furnace until it is finally mixed with the other gases toward the exit end of the furnace. Miller introduces hydrocarbon axially into a cylindrical furnace and introduces air in the same direction, as a ring surrounding the hydrocarbon. Such methods and apparatus of Hanson et al., Ayers, and Miller generally result in furnace carbon black having the usual particle size. Wiegand produces hot combustion gases at one end of an elongated furnace and injects concentrated streams of hydrocarbon approximately at right angles into the hot combustion gases as they pass through the furnace. This process of Wiegand causes fairly rapid mixing of the hydrocarbon and hot combustion gases and produce furnace carbon black in low yields which is somewhat finer than the usual furnace carbon black but which, generally, is not as fine as channel carbon black.

Those skilled in the art have believed that the inferior character of the carbon obtained by the furnace process is caused by the length of time that the carbon particles are maintained at a high temperature and hence have been of the opinion that the carbon must be removed from the furnace and cooled as rapidly as possible. If the decomposition of the hydrocarbon is slow, as in the case of methane, the quality of the carbon is improved by the most rapid removal and cooling of the carbon from the furnace. On the other hand, I have found that, if the hydrocarbon is rapidly decomposed while in a highly diluted condition, I can successfully produce very finely divided furnace carbon black in good yields, and that the length of time during which the carbon is maintained in a heated condition is less important and apparently is not critical. This is apparently due to the fact that the particles of carbon black which are formed cannot grow in size by the deposition of additional carbon on their surfaces caused by the decomposition of more hydrocarbon. In contrast, the usual methods comprise introducing a concentrated stream of hydrocarbon into moderately turbulent combustion gases or surrounding a stream of hydrocarbon with air or combustion gases, whereby the hydrocarbon is in a concentration sufficient to cause the particles of carbon to grow to a considerable size. Somewhat finer carbon may be obtained in some prior processes by increasing the amount of air employed and thereby increasing the dilution of the hydrocarbon, but such increased amount of air burns much more of the hydrocarbon and materially decreases the yield of carbon black.

It is an object of the present invention to provide improved apparatus for producing furnace carbon black. Another object is to provide a furnace for producing carbon black which will cause a more rapid and thorough mixing of hydrocarbon with combustion gases and, particularly, will result in extremely rapid and complete decomposition of active hydrocarbon vapors, and which is adapted to produce furnace carbon black of improved properties in good yields. A further object is to provide an improved process for making furnace carbon black. A still further object is to provide a method for producing carbon black in the size range of channel carbon black from hydrocarbons for which the free energy of formation is positive, particularly by rapidly and thoroughly diluting such hydrocarbons with hot combustion gases and decomposing such hydrocarbons extremely rapidly and completely. A further object is to advance the art. Still other objects will appear hereinafter.

The above and other objects may be accomplished in accordance with my invention which constitutes a method which comprises impinging hot combustion gases upon a ledge while passing the gases forming the combustion gases through a combustion chamber at a space velocity of from about 150 to about 600 cubic feet per cubic foot per minute to form a violently turbulent mass of hot combustion gases and injecting into such violently turbulent mass an expanding cone of hydrocarbon in a substantially gaseous state, the hydrocarbon being one for which the free energy of formation is positive or a mixture of two or more of such hydrocarbons, and a furnace adapted for such method. The furnace of my invention comprises a combustion chamber having an inlet end wall, a substantially flat exit end wall and enclosing side walls, in which the distance between the end walls is from about 0.25 to about 2 times the distance between opposing side walls, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicularly to the exit end wall, and an outlet orifice in the center of the exit end wall having an area equal to from about 5% to about 25% of the cross-sectional area of the combustion chamber normal to the side walls, a reaction chamber in open communication with the combustion chamber through the outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

The preferred method of my invention comprises injecting into the combustion chamber at a plurality of positions around the combustion chamber adjacent the side walls thereof and burning therein a combustible mixture of a gaseous fuel and an oxygen-containing gas in a proportion of from about 90% to about 125% of that required for complete combustion of the gaseous fuel, the combustible mixture being injected into the combustion chamber at a rate such that the gases forming the combustion gases pass through the combustion chamber at a space velocity of from about 150 to about 600 cubic feet per cubic foot per minute, directing the burning mixture and combustion gases perpendicularly to the exit end wall until they impinge on such wall so that the combustion gases become violently turbulent and flow as a turbulent mass to the center of the combustion chamber and to the outlet orifice, simultaneously injecting into the combustion chamber an expanding cone of substantially gaseous hydrocarbon for which the free energy of formation is positive, directing such cone of hydrocarbon axially of the combustion chamber toward the outlet orifice and into the turbulent mass of combustion gases, and flowing the resulting mixture of carbon and gases through the outlet orifice and reaction chamber, and separating the carbon from such resulting mixture.

Operation, in accordance with my improved method, produces carbon black of a particle size corresponding to that of channel carbon black in high yields. The furnace of my invention is adapted for processes other than my novel process but is particularly adapted for operation in accordance with my novel process. For example, by reducing the space velocity of the gases forming the combustion gases, I can produce carbon of larger particle size and, by sufficiently reducing the space velocity, I can employ hydrocarbons whose free energy of formation is negative and thereby produce carbon of larger particle size.

My novel process and apparatus will be more readily understood by reference to the accompanying drawings which show representative forms of the apparatus, and in which:

Fig. 1 is a vertical sectional view of one embodiment of the apparatus of my invention;

Fig. 2 is a horizontal sectional view taken on the line 2—2 of Fig. 1;

Fig. 3 is a horizontal sectional view taken on the line 3—3 of Fig. 1;

Fig. 4 is a vertical sectional view similar to Fig. 1, with parts omitted, illustrating a modified form of outlet orifice from the combustion chamber to the reaction chamber;

Fig. 5 is a vertical sectional view similar to Fig. 1, illustrating a modified form of construction for the inlet end wall of the combustion chamber and a different burner construction;

Fig. 6 is a horizontal sectional view taken on the line 6—6 of Fig. 5;

Fig. 7 is an enlarged detailed view of the burners and of the means for supporting the inlet end wall of the structure of Figs. 5 and 6;

Fig. 8 is a top plan view of the structure of Fig. 7;

Fig. 9 is a view similar to Fig. 5 illustrating another form of supporting means for an inlet end wall of the type shown in Figs. 5 to 8, particularly for a horizontal furnace.

Referring first to the structure shown in Figs. 1 to 3 inclusive, the body of the furnace is composed of heat-resisting ceramic material 12 forming the side walls 14 and outlet end wall 16 of the combustion chamber 18 and the side walls of the reaction chamber 20. The inlet end wall 22 of the combustion chamber is also formed of heat-resisting ceramic material. Preferably, such inlet end wall is in the form of a removable cover to permit ready access to the combustion chamber and the reaction chamber for cleaning and for repairs. The distance between the end walls 16 and 22 of the combustion chamber should be from about 0.25 to about 2 times the diameter of the combustion chamber and preferably from about 0.4 to about 1 times the diameter of the combustion chamber. When the hydrocarbon to be decomposed is injected into the combustion chamber in the form of a vapor, the distance between the end walls will preferably be from about 0.4 to about 0.5 times the diameter of the combustion chamber. When the hydrocarbon to be decomposed is introduced into the combustion chamber in the form of a mist, the distance between the end walls will preferably be from about 0.75 to about 1 times the diameter of the combustion chamber in order that the liquid particles may be vaporized before entering the main mass of hot combustion gases adjacent the outlet orifice.

The body of the furnace is enclosed by a metal shell 24 which is open at its upper end. A plenum chamber 26, in back of the end wall 22, is formed of metal walls detachably secured to the upper end of the shell 24 by nuts and bolts 30 or other suitable fastening means. A diametrically extending supply pipe 32 opens into the upper portion of the plenum chamber for supplying air or other oxygen-containing gas. The supply pipe 32 will usually be provided with a blower 34 for controlling the amount of air or oxygen-containing gas introduced into the furnace.

The inlet end wall 22 is provided at its center with an inlet opening 36 for a hydrocarbon injector tube 38 which extends through the plenum chamber and such inlet opening to the inlet end of the combustion chamber where it usually terminates in a nozzle 40 substantially flush with the surface of the inlet end wall 22. The nozzle 40 may be of any desired and well-known construction which will cause the injected hydrocarbon to take the form of an expanding cone. The nozzle may be omitted and a simple open ended injector tube of small diameter may be used when the hydrocarbon is in vapor form and under a pressure of several pounds above the pressure in the combustion chamber, the expansion of the vapor due to the release of pressure as it leaves the injector pipe resulting in the formation of the desired expanding cone of hydrocarbon. When the injector tube, or the nozzle, or both are composed of metal, such as iron or steel, the inlet opening 36 will preferably be slightly larger than the outer diameter of the injector tube so that the outer surface of the tube will be slightly spaced from the edges of the inlet opening to provide a passage for a small amount of cooling air to flow from the plenum chamber into the combustion chamber and over the surface of the injector tube and nozzle to protect them from the high temperatures in the combustion chamber. The amount of air or oxygen-containing gas, passing through such inlet opening, may be as much as 8% of the total oxygen-containing gas introduced into the combustion chamber, but should not exceed substantially 8%. Such amount of oxygen-containing gas so introduced will not alter the quality of the carbon.

The inlet wall of the combustion chamber is also provided with a plurality of inlet openings 42 perpendicular to such wall positioned around the combustion chamber adjacent the side walls thereof. Each inlet opening 42 is provided with a burner 44 of a conventional inspirator type having air ducts 46 opening into the plenum chamber 26. Each burner is provided with a gaseous fuel injected under pressure through jet pipes 48 on a circular supply pipe 50 connected to a main supply pipe 52.

In the construction shown in Figs. 1 to 3, the outlet orifice 54 in the outlet end of the combustion chamber coincides with the junction of the reaction chamber 20 and the combustion chamber. The cross-sectional area of the orifice may be equal to from about 5% to about 25% of the cross-sectional area of the combustion chamber normal to the side walls. Preferably, the outlet orifice will have an area equal to from about 6% to about 15% of the cross-sectional area of the combustion chamber. If the area of the outlet orifice is less than about 5% of the cross-sectional area of the combustion chamber, excessive pressures will be required to force a reasonable amount of gases through the furnace. The area of the outlet orifice should not be more than substantially 25% of the cross-sectional area of the combustion chamber so as to provide a ledge 16 of sufficient size to intercept the combustion gases and produce the desired turbulence therein.

The reaction chamber 20 should have a volume equal to at least 45% of the volume of the combustion chamber to ensure completion of the decomposition of the hydrocarbon. The maximum volume of the reaction chamber is not critical and is limited solely by practical considerations. Preferably, it will be from 45% to about 200% of the volume of the combustion chamber. The reaction chamber should also have a cross-sectional area equal to from about 5% to about 100% of the cross-sectional area of the combustion chamber and at least equal to the area of the outlet orifice. The smaller diameter reaction chambers tend to create back pressure on the burners and to become inconveniently long. Therefore, it is usually best to use reaction chambers of larger diameters with the smaller outlet orifices so as to reduce the back pressure on the burners and to permit reduction in the length of the reaction chamber. Such structure is shown in Fig. 4 where the outlet orifice is reduced by an inwardly projecting annular ledge 56. If the reaction chamber is increased in diameter until it has a cross-sectional area equal to the cross-sectional area of the combustion chamber, the outlet end wall of the combustion chamber and the orifice will be formed simply by an inwardly projecting annular ledge, as shown in dot and dash lines in Fig. 4.

As shown in Fig. 1, the reaction chamber is provided with an outlet opening 58 passing through the side wall of the furnace near the bottom of the reaction chamber. This outlet opening leads to suitable means for separating the carbon from the gases, such as a spray tower 60 and a carbon collecting apparatus 62 of conventional construction. The spray tower is provided with a water supply pipe 64, a spray nozzle 66, and a valved pipe 68 at the bottom for removing accumulated water. An exhaust pipe 70 leads off from the upper end of the spray tower into the bottom of the carbon collecting apparatus 62. Such carbon collecting apparatus comprises a filter bag 72 for filtering the carbon from the gases, a valved pipe 74 for drawing off collected carbon, and an exhaust pipe 76 for the gases. It will be understood that other types of carbon collecting apparatus may be substituted for the spray tower and filter bag, such as an electrical precipitator and a cyclone separator. Also, the spray tower may be replaced by means for cooling the products by cool gases as in Patents 1,909,163 and 1,925,130 to Brownlee, or as disclosed in my copending application, Serial No. 91,077, filed May 3, 1949.

In operation, a gaseous fuel such as natural gas will be forced through pipes 52 and 50 and jet pipes 48 into the burners 44. Air or other suitable oxygen-containing gas for the combustion is introduced through supply pipe 32 and is drawn into the burners with the gas and forms a combustible mixture which burns as it enters the combustion chamber. The amount of oxygen-containing gas is controlled by the amount which is delivered by the blower 34 and the supply pipe 32. At the start of the operation, the pressure in the plenum chamber 26 rises until it becomes sufficient to force the oxygen-containing gas through the burners in the required volume. The pressure in the plenum chamber, during normal operation, will usually vary from about 2 to about 30 inches of water, depending on the exact burner construction and on the combustion ratio of oxygen-containing gas to hydrocarbon desired. The hydrocarbons to be decomposed are injected through the injector tube 36 and nozzle 40 in the form of an expanding cone directed coaxially of the combustion chamber to the outlet orifice and the hot turbulent combustion gases adjacent the outlet orifice. The size of the expanding cone of hydrocarbon is generally regulated so that it will have an area approximately equal to the area of the outlet orifice at such orifice, when injected in the absence of the combustion gases. The mixing of the hydrocarbon with the hot turbulent combustion gases is extremely rapid and the decomposition is almost instantaneous and substantially complete before the mixture passes through the outlet orifice. The decomposition of any remaining hydrocarbon will be completed in a very short period of time in the reaction chamber after it enters the reaction chamber. The carbon laden gases then pass through the reaction chamber and into the carbon collecting apparatus.

Figs. 5 to 8 inclusive of the drawings illustrate a furnace similar to that in Figs. 1 to 3 except for the structure of the inlet end wall of the combustion chamber and the burners. In this structure, the inlet end wall 78 is formed by a block-like partition of heat-resisting ceramic material. Such block-like partition is positioned between the side walls 14 of the combustion chamber 18 with its perimeter spaced slightly, usually from about 3/8 inch to about 3/4 inch, from the inner surface of such side walls so as to form an annular passage 80 for the combustible mixture of gaseous fuel and oxygen-containing gas into the inlet end of the combustion chamber. This partition has a sectional metal band 82 passing entirely around its upper end. Each section of the band has a wing 84 extending radially from each end, the adjacent wings of abutting sections forming a pair of wings which are secured to each other by nuts and bolts 86. One of each such pair of wings is provided with a threaded boss 86. Adjusting screws 88 are threaded through the bosses and have their ends resting upon the upper end of the ceramic side wall 12. By adjusting the screws 88, the distance between the end walls of the combustion chamber may be varied as desired.

A burner pipe 92 encircles the partition adjacent the top outer wall of the annular passage 80 and is spaced slightly from the partition. The burner pipe rests upon the end of the ceramic side wall 12 and is connected with a gas supply pipe 94. The burner pipe 92 is also provided with a plurality of orifices 96 in its lower surface over its length directed into the annular passage 80 between the edges of the partition and the side walls, preferably at an angle of about 45°.

The furnace of Figs. 5 to 8 operates similarly to that of Figs. 1 to 3. The gaseous fuel jets downwardly into the annular passage together with air or other oxygen-containing gas from the plenum chamber. The gaseous fuel and oxygen-containing gas mix in the annular passage to form a combustible mixture which is directed down along the sides of the combustion chamber and burns, the mixture of burning gases and hot combustion gases impinging perpendicularly onto the outlet end wall of the combustion chamber and forming the violently turbulent hot combustion gases flowing to and through the outlet orifice and reaction chamber. The relative proportions of the combustion chamber, the outlet orifice and the reaction chamber will be the same as hereinbefore described with respect to Figs. 1 to 4 and may be varied within the same ranges.

While the furnaces as so far described are vertical, they may be horizontal, if desired. In such case, the outlet from the reaction chamber usually will be through the end of the furnace rather than through the side wall. When a furnace of the character of Figs. 5 to 8 is arranged in a horizontal position, the means for supporting the inlet end wall will be modified, one suitable form of means being shown in Fig. 9. In this construction metal plates 100 extend inwardly from the shell 24 over the end of the ceramic side walls 12. One end of a screw threaded stud 98 is welded to each plate 100 as shown at 102. Each stud passes loosely through a boss 88 and the adjustment is made by a pair of nuts 104 threaded on each stud on opposite sides of the boss.

The preferred method of my invention will now be described in more detail.

The hydrocarbons to be decomposed, in accord with the preferred method of my invention, are those for which the free energy of formation is positive. Such hydrocarbons include in general, aromatic hydrocarbons, alkynes which are hydrocarbons of the acetylene series, alkenes such as ethylene and the like, high molecular weight alkanes of 6 or more carbon atoms and saturated and unsaturated cyclic hydrocarbons other than those of the benzene series. When such hydrocarbons are employed in my preferred method, they are completely decomposed with such ease and rapidity that the decomposition is substantially complete by the time that they reach the outlet orifice and the decomposition is completed very shortly after they have passed through the outlet orifice into the reaction chamber. The hydrocarbons whose free energy of formation is negative, such as the saturated hydrocarbons of one to five carbon atoms, are inoperative at space velocities as high as about 150 cubic feet per cubic foot per minute because they are too stable and their decomposition is too slow to enable them to be effectively decomposed to carbon at such high space velocities.

The gaseous fuel injected through the burners to form the combustion gases may be any suitable fuel, such as vapors of normally liquid or solid hydrocarbons, but will usually be a normally gaseous hydrocarbon such as natural gas and the like. The oxygen-containing gas for the combustion will usually be air, but it may be a mixture of free oxygen with other gases such as carbon dioxide, carbon monoxide and water vapor. The amount of air or other oxygen-containing gas injected through the burners will be sufficient to substantially completely burn the gaseous fuel and usually will be slightly in excess of that required to completely burn all of the gaseous fuel. The minimum amount of air or oxygen-containing gas is about 90% of that required for complete combustion of the gaseous fuel and the maximum amount is about 125% of that required for complete combustion of the gaseous fuel.

The streams of gases forming the combustion, gases must be directed perpendicularly to the exit end wall of the combustion chamber and caused to impinge on such end wall whereupon they change direction, splashing in all directions, with portions striking the side walls and rebounding therefrom and the various portions striking each other, so that the mass of combustion gases become quite turbulent. At a space velocity of from about 150 to about 600 cubic feet per cubic foot per minute, such turbulence is extremely violent. Preferably, I employ a space velocity of from about 160 to about 450 cubic feet per cubic foot per minute. The great mass of the turbulent combustion gases will flow in that portion of the combustion chamber closest to the outlet end wall. However, a minor proportion of the combustion gases will, of course, fill the rest of the combustion chamber.

The hydrocarbon to be decomposed is injected into the combustion chamber in the form of an expanding cone of substantially gaseous hydrocarbon, such cone being directed coaxially of the combustion chamber and the outlet orifice. By "substantially gaseous," I mean to include gas, vapor and mist. It will be understood that an expanding cone of hydrocarbon is one which has its apex adjacent the point of introduction into the inlet end of the combustion chamber and which expands as it passes into and through the combustion chamber so that its base is directed at the exit end of the combustion chamber and at the outlet orifice therein. The area of the cone of hydrocarbon adjacent the outlet orifice should be approximately equal to the area of such orifice. The area of the cone of hydrocarbon adjacent the outlet orifice is determined on the basis of the absence of the hot combustion gases or other gases which would interfere with the normal contour of the cone as injected into space. When the minimum size outlet orifice is used, it will generally be desirable to have the area of the base of the cone of hydrocarbon slightly larger than the area of the outlet orifice. When the maximum size outlet orifice is used, the area of the cone adjacent such orifice may be slightly smaller than the area of the orifice. Usually, the cone of hydrocarbon will expand at an angle of from about 20° to about 30°.

The rate of injection of the hydrocarbon to be decomposed will be in accord with the well known principles and practices of the art. The rate will vary with the temperature and amount of the combustion gases, the amount of excess oxygen, and the quality of the carbon desired. Generally, the rate of injection of the hydrocarbon will be regulated with respect to the gaseous fuel and oxygen-containing gas introduced into the combustion chamber so that the ratio of the oxygen-containing gas to the total of the gaseous fuel and hydrocarbon to be decomposed will be that which would be required to burn from about 30% to about 55% of such total.

As the cone of hydrocarbon enters the inlet end of the combustion chamber, it becomes somewhat diluted and heated by combustion gases, such dilution and heating increasing as the cone of hydrocarbon advances into the combustion chamber and expands. However, the amount of hot combustion gases, which produces such dilution and heating, is insufficient to raise the hydrocarbon to its decomposition temperature before the resulting diluted hydrocarbon strikes the main mass of turbulent combustion gases, but will be sufficient to vaporize hydrocarbon which has been injected as a mist. Upon striking the main mass of hot violently turbulent combustion gases, the hydrocarbon is very highly diluted, heated to the decomposition temperature and decomposed substantially instantaneously. The resulting mixture passes into the reaction chamber where the decomposition of any remaining hydrocarbon is completed. The carbon laden gases then pass to apparatus for separating the carbon from the gases.

In order to more clearly illustrate my invention, preferred modes of carrying the same into effect, and the advantageous results to be obtained thereby, the following examples are given:

*Example I*

This example illustrates the production of fine carbon black with the furnace of Figs. 1 to 3, modified as in Fig. 4.

The combustion chamber was circular with a diameter of 32 inches and a depth of 15 inches. The outlet orifice from the combustion chamber was constructed as Fig. 4, the narrow portion of the orifice being 8 inches in diameter. The reaction chamber or tube was 12 inches in diameter and opened to this size 9 inches from the exit end of the combustion chamber. The reaction chamber was 10 feet long and opened into a spray chamber where the gases were cooled before the carbon was collected.

The hydrocarbon to be cracked was a catalytic recycle oil obtained as a by-product from the catalytic cracking of petroleum in the manufacture of gasoline. The distillation range was 360° F. to 585° F. and 55% of the material was soluble in sulfuric acid, indicating this amount of aromatic and unsaturated hydrocarbons, the remainder consisting of various straight chain, branched chain and cyclic saturated hydrocarbons.

The fuel, used for heating, was natural gas with a heat value of 1050 B. t. u. per cubic foot.

Eight inspirator type burners were used arranged as shown in Fig. 3. These eight burners used 169 C. F. M. (cubic feet per minute) of gas and 2215 C. F. M. (cubic feet per minute) of air. An additional 98.5 C. F. M. of air, or 4.26% of the total air was passed through the inlet opening around the hydrocarbon injection tube. The space velocity of the gases forming the combustion gases, in the combustion chamber, was about 338 cubic feet per cubic foot per minute.

The hydrocarbon was vaporized and the vapors were injected at the rate of 3.49 gallons per minute into the combustion gases which were at a temperature of about 2520° F.

The carbon was collected by passing through a conventional electrical precipitator and cyclone separator. The yield was 3.39 pounds of carbon per gallon of hydrocarbon. An examination by means of the electron microscope showed that most of the particles were about 0.07 micron in diameter, corresponding in size to medium processing channel black. When this carbon and channel carbon were each incorporated into tread stocks and tested for resistance to abrasion, the furnace carbon was found to produce 115% of the resistance of the channel carbon.

When the hydrocarbon oil, which was the source of carbon, was replaced in a similar experiment with from 11 to 500 C. F. M. of natural gas, no carbon was produced. The gas passed through the furnace substantially undecomposed due to its stability and the high space velocity. The 500 C. F. M. of gas is substantially equivalent in amount to 3.49 gallons per minute of the oil.

Example II

Example I was duplicated except that the combustion chamber opened directly into a 12 inch reaction tube. The carbon particles produced were less than 0.1 micron in diameter and equal in fineness to easy processing channel black. The yield of carbon was 3.25 pounds per gallon of oil.

This example was repeated except that all of the air was passed through the burners and none around the hydrocarbon inlet tube. The results were substantially identical with those in which air was admitted around the hydrocarbon inlet tube.

Example III

The furnace of Example I was modified by increasing the length of the combustion chamber to 28 inches for operation with oil introduced as a mist. 1925 C. F. M. of air and 159 C. F. M. of natural gas were passed through the burners and 98 C. F. M. of air was passed around the atomizing nozzle. The space velocity of the gases forming the combustion gases was about 165 cubic feet per cubic foot per minute.

The hydrocarbon to be decomposed was a residue from the manufacture of gasoline and had a distillation range of from 330° F. to 525° F. and an aniline point of 38, measured by the A. S. T. M. method. This hydrocarbon was preheated to a temperature of 312° F. and forced at about 80 pounds pressure through an orifice .125 inch in diameter just as it entered the combustion chamber. This arrangement produced a fine mist in the form of a cone which spread at an angle of about 20°. This mist rapidly evaporated and entered the violently turbulent combustion gases which were at a temperature of 2500° F. After passing through the reaction tube, the carbon laden gases were cooled and the carbon was collected.

The yield of carbon was 2.9 pounds per gallon and the particles were less than 0.1 micron in diameter. When the resistance to abrasion imparted to a tread rubber compound was compared with channel black, it was found to be 105 percent.

Example IV

The furnace employed is shown in Figs. 4, 6, 7 and 8. The inlet end piece 78 of the combustion chamber extended into the furnace between the walls for six inches and left an opening of ½ inch between the walls and the perimeter of the end piece. The gas manifold was drilled with 3⁄2 inch holes spaced 1 inch apart and directed to strike the ceramic end piece at an angle of about 45 degrees so the gas would enter the annular opening. The distance from the surface of the ceramic end piece to the surface of the exit end of the combustion chamber, was 16 inches and the diameter of the combustion chamber was 32 inches. The outlet orifice and the reaction tube were 8 inches in diameter and the reaction tube was 10 feet long.

208 C. F. M. of fuel gas and 2772 C. F. M. of air were passed through the burner and 90 C. F. M. of air was used to protect the hydrocarbon inlet tube from the high temperatures in combustion chambers. This is a space velocity of about 412 cubic feet per cubic foot per minute in the combustion chamber. The hydrocarbon to be decomposed consisted of an oily mixture of aromatic and unsaturated hydrocarbons which were 75% soluble in sulfuric acid.

This mixture was vaporized and the vapors were injected into the furnace through a ¾ inch pipe at the rate of 4.2 gallons per minute. The yield was 3.4 pounds of carbon per gallon of hydrocarbon. The carbon had a particle size of less than 0.1 micron.

Example V

The furnace of Example IV was employed to decompose diesel fuel. Air at the rate of 2223 C. F. M. and gas at the rate of 169 C. F. M. were passed through the burner. Air at the rate of 90 C. F. M. was used to protect the hydrocarbon inlet tube. The gases forming the combustion gases had a space velocity in the combustion chamber of about 340 cubic feet per cubic foot per minute. 3.5 gallons per minute of diesel fuel were vaporized and introduced through a ½ inch pipe. The combustion gases were at a temperature of 2600° F.

The yield was 2.6 pounds of carbon per gallon and the particle size was about 0.1 micron.

Example VI

The furnace of Example I was used to decompose benzene. 119.7 C. F. M. of natural gas and 1694 C. F. M. of air were passed through the burners. 102 C. F. M. of air was used to protect the hydrocarbon inlet tube. This is a space velocity of about 254 cubic feet per cubic foot per minute. Benzene, at the rate of 2.4 gallons per minute, was vaporized and the vapors introduced at a temperature of 270° F. The combustion gases were at a temperature of 2270° F. The yield of carbon was 3.3 pounds per gallon and the carbon particles were about 0.07 micron in diameter.

The process was repeated except that the total air was passed through the burners and none as a protecting layer around the hydrocarbon inlet tube. The results were substantially the same.

The experiment was repeated except that the benzene was introduced as a fine mist by passing it through an atomizing nozzle which produced a cone of about 30°. The nozzle was protected by passing 100 C. F. M. of the air around it. The yield of carbon was 3 pounds per gallon and the particle size was about 0.07 micron.

Example VII

In this example, the furnace was constructed as in Figs. 4 to 7. The diameter of the combustion chamber was 16 inches and the outlet orifice was 6 inches in diameter. The depth of the combustion chamber was 10 inches. The ceramic block at the inlet end left an annular opening ¼ inch wide through which the fuel gas and air were introduced. The reaction tube was 6 inches in diameter and 8 feet long. 17 C. F. M. of natural gas and 250 C. F. M. of air were introduced through the burner to produce combustion gases at a temperature of 2610° F. The gases, forming the combustion gases, had a space velocity of about 229 cubic feet per cubic foot per minute. No air was used to protect the hydrocarbon inlet tube. A mixture of equal weights of naphthalene and turpentine was passed through a heated tube and vaporized at the rate of .35 gallon per minute and the vapors introduced into the combustion chamber through a ¼ inch pipe. After passing through the reactor tube, the gases and carbon were cooled to 240° F. by means of a water spray and the carbon collected in a bag filter. The yield was 3.5 pounds of carbon per gallon having a particle size of less than 0.1 micron.

It will be understood that the embodiments of my apparatus as disclosed in the drawings, are merely given for illustrative purposes and that many variations and modifications in the details of construction can be made without departing from the spirit or scope of my invention.

While the combustion chambers and reaction chambers are shown as cylindrical, it will be understood that they may be of other shapes, such as oval, square, and rectangular. The oxygen-containing gas may be provided by means other than a plenum chamber such as suitable supply pipes, and other types of burners may be used. The furnaces may be vertical or horizontal, but vertical furnaces are generally of more stable construction and are preferred.

It will also be understood that my preferred method for producing finely divided carbon may be varied within the limits disclosed, that the specific examples heretofore given are given for illustrative purposes solely, and that my invention is not to be limited to any specific embodiment disclosed therein.

It will be further understood that my furnace is adapted to be used for making carbon black of different character and by different methods than my preferred method. Space velocities, lower than about 150 cubic feet per cubic foot per minute, may be used whereby carbon black of coarser particle size will be obtained. Carbon black of coarser particle size may also be obtained by introducing the hydrocarbon in a narrow concentrated stream, instead of an expanding cone. The furnace may be used to produce carbon black from natural gas and like hydrocarbons by greatly reducing the space velocity of the gases forming the combustion gases, but the carbon black will be coarser, approaching that obtained in the prior art furnaces.

From all of the preceding, it will be evident that I have provided a novel type of furnace for producing carbon black which is simple and economical in construction and which is particularly adapted for the production of carbon black having a fineness equal to that of channel carbon black. Also, I have provided a novel method for producing furnace carbon having a fineness equal to that of channel carbon and in good yields. Therefore, it will be apparent that my invention constitutes a valuable contribution to and advance in the art.

I claim:

1. A furnace for the production of carbon black by the thermal decomposition of hydrocarbons comprising a combustion chamber having an inlet wall, a substantially flat exit end wall and enclosing side walls, in which the distance between the end walls is from about 0.25 to about 2 times the distance between opposing side walls, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, an outlet orifice in the center of the exit end wall having an area equal to from about 5% to about 25% of the cross-sectional area of the combustion chamber normal to the side walls, a reaction chamber in open communication with the combustion chamber through said outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

2. A furnace for the production of carbon black by the thermal decomposition of hydrocarbons comprising a combustion chamber having an inlet wall, a substantially flat exit end wall and enclosing side walls, in which the distance between the end walls is from about 0.4 to about 1 times the distance between opposing side walls, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, an outlet orifice in the center of the exit end wall having an area equal to from about 5% to about 25% of the cross-sectional area of the combustion chamber normal to the side walls, a reaction chamber in open communication with the combustion chamber through said outlet orifice and having a volume equal to at least 45% the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

3. A furnace for the production of carbon black by the thermal decomposition of hydrocarbons comprising a combustion chamber having an inlet wall, a substantially flat exit end wall and enclosing side walls, in which the distance between the end walls is from about 0.4 to about 1 times the distance between opposing side walls, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, an outlet orifice in the center of the exit end wall having an area equal to from about 6% to about 15% of the cross-sectional area of the combustion chamber normal to the side walls, a reaction chamber in open communication with the combustion chamber through said outlet orifice and having a volume equal to at least 45% the volume of the combustion chamber and a cross-sectional area equal to from about 6% to about 100% of the cross-sectional area of the combustion chamber and at least equal to the area of the outlet orifice, and carbon collecting means connected with the exit end of the reaction chamber.

4. A furnace for the production of carbon black by the thermal decomposition of hydrocarbons comprising a combustion chamber having an inlet wall, a substantially flat exit end wall and enclosing side walls, in which the distance between the end walls is from about 0.4 to about 1 times the distance between opposing side walls, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, an outlet orifice in the center of the exit end wall having an area equal to from about 6% to about 15% of the cross-sectional area of the combustion chamber normal to the side walls, a reaction chamber in open communication with the combustion chamber through said outlet orifice and having a volume equal to from 45% to about 200% of the volume of the combustion chamber and a cross-sectional area equal to from about 6% to about 15% of the cross-sectional area of the combustion chamber and at least equal to the area of the outlet orifice, and carbon collecting means connected with the exit end of the reaction chamber.

5. A furnace for the production of carbon black by the thermal decomposition of hydrocarbons comprising a cylindrical combustion chamber having an inlet wall, a substantially flat exit end wall and enclosing cylindrical side walls, in which the distance between the end walls is from about 0.25 to about 2 times the diameter of the combustion chamber, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, a circular outlet orifice in the center of the exit end wall having an area equal to from about 5% to about 25% of the cross-sectional area of the combustion chamber normal to the side walls, a cylindrical reaction chamber in open communication with the combustion chamber through said outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

6. A furnace for the production of carbon black by the thermal decomposition of hydrocarbons comprising a cylindrical combustion chamber having an inlet wall, a substantially flat exit end wall and enclosing cylindrical side walls, in which the distance between the end walls is from about 0.4 to about 1 times the diameter of the combustion chamber, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, a circular outlet orifice in the center of the exit end wall having an area equal to from about 5% to about 25% of the cross-sectional area of the combustion chamber normal to the side walls, a cylindrical reaction chamber in open communication with the combustion chamber through said outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

7. A furnace for the production of carbon black by the thermal decomposition of hydrocarbons comprising a cylindrical combustion chamber having an inlet wall, a substantially flat exit end wall and enclosing cylindrical side walls, in which the distance between the end walls is from about 0.4 to about 1 times the diameter of the combustion chamber, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, a circular outlet orifice in the center of the exit end wall having an area equal to from about 6% to about 15% of the cross-sectional area of the combustion chamber normal to the side walls, a cylindrical reaction chamber in open communication with the combustion chamber through said outlet orifice and having a volume equal to at least 45% of the volume of the combustion chamber and a cross-sectional area equal to from about 6% to about 100% of the cross-sectional area of the combustion chamber and at least equal to the area of the outlet orifice, and carbon collecting means connected with the exit end of the reaction chamber.

8. A furnace for the production of carbon black by the thermal decomposition of hydrocarbons comprising a cylindrical combustion chamber having an inlet wall, a substantially flat exit end wall and enclosing cylindrical side walls, in which the distance between the end walls is from about 0.4 to about 1 times the diameter of the combustion chamber, a hydrocarbon injector tube in the center of the inlet end wall opening into the inlet end of the combustion chamber coaxially with the combustion chamber, burners opening into the inlet end of the combustion chamber at a plurality of positions around the combustion chamber adjacent the side walls and directed perpendicular to the exit end wall, a circular outlet orifice in the center of the exit end wall having an area equal to from about 6% to about 15% of the cross-sectional area of the combustion chamber normal to the side walls, a cylindrical reaction chamber in open communication with the combustion chamber through said outlet orifice and having a volume equal to from 45% to about 200% of the volume of the combustion chamber and a cross-sectional area equal to from about 6% to about 100% of the cross-sectional area of the combustion chamber and at least equal to the area of the outlet orifice, and carbon collecting means connected with the exit end of the reaction chamber.

9. A furnace for the production of carbon black by the thermal decomposition of hydrocarbons comprising a combustion chamber having an inlet end wall, a substantially flat exit end wall and enclosing side walls, in which the distance between the end walls is from about 0.25 to about 2 times the distance between opposing side walls, a plenum chamber for air in back of the inlet end wall, an inlet opening in the center of the inlet end wall, a hydrocarbon injector tube passing through the inlet opening and opening into the inlet end of the combustion chamber coaxially with the combustion chamber, the outer surface of the injector tube being slightly spaced from the edges of the inlet opening to provide a passage for a small amount of cooling air from the plenum chamber over the surface of the injector tube and into the combustion chamber, burners opening into the inlet end of the combustion chamber at a plurality of positions around the combustion chamber adjacent the side walls and directed perpendicular to the exit end wall, an outlet orifice in the center of the exit end wall having an area equal to from about 5% to about 25% of the cross-sectional area of the combustion chamber normal to the side walls, a reaction chamber in open communication with the combustion chamber through said outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

10. A furnace for the production of carbon black by the thermal decomposition of hydrocarbons comprising a combustion chamber having an inlet end wall, a substantially flat exit end wall and enclosing side walls, in which the distance between the end walls is from about 0.25 to about 2 times the distance between opposing side walls, a plenum chamber for air in back of the inlet end wall, an inlet opening in the center of the inlet end wall, a hydrocarbon injector tube passing through the inlet opening and opening into the inlet end of the combustion chamber coaxially with the combustion chamber, a plurality of burners passing through the inlet end wall from the plenum chamber positioned around adjacent the perimeter of the inlet end wall and opening into the inlet end of the combustion chamber around the combustion chamber adjacent the side walls and directed perpendicular to the exit end wall, air ducts for the burners opening into the plenum chamber, fuel supply pipe for the burners, an outlet orifice in the center of the exit end wall having an area equal to from about 5% to about 25% of the cross-sectional area of the combustion chamber normal to the side walls, a reaction chamber in open communication with the combustion chamber through said outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

11. A furnace for the production of carbon black by the thermal decomposition of hydrocarbons comprising a combustion chamber having an inlet end wall, a substantially flat exit end wall and enclosing side walls, in which the distance between the end walls is from about 0.4 to about 1 times the distance between opposing side walls, a plenum chamber for air in back of the inlet end wall, an inlet opening in the center of the inlet end wall, a hydrocarbon injector tube passing through the inlet opening and opening into the inlet end of the combustion chamber coaxially with the combustion chamber, a plurality of burners passing through the inlet end wall from the plenum chamber positioned around adjacent the perimeter of the inlet end wall and opening into the inlet end of the combustion chamber around the combustion chamber adjacent the side walls and directed perpendicular to the exit end wall, air ducts for the burners opening into the plenum chamber, fuel supply pipe for the burners, an outlet orifice in the center of the exit end wall having an area equal to from about 5% to about 25% of the cross-sectional area of the combustion chamber normal to the side walls, a reaction chamber in open communication with the combustion chamber through said outlet orifice and having a volume equal to from 45% to about 200% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

12. A furnace for the production of carbon black by the thermal decomposition of hydrocarbons comprising a combustion chamber having an inlet end wall, a substantially flat exit end wall and enclosing side walls, in which the distance between the end walls is from about 0.25 to about 2 times the distance between opposing side walls, a plenum chamber for air in back of the inlet end wall, the inlet end wall being formed by a block-like partition positioned between the side walls with its perimeter spaced slightly from the inner surfaces of the side walls forming an annular passage for a combustible mixture of gaseous fuel and air from the plenum chamber into the inlet end of the combustion chamber, a fuel supply pipe in the plenum chamber positioned adjacent to and surrounding the edges of the partition and having a plurality of orifices in its lower surface over its length directed into the space between the edges of the partition and the side walls, an inlet opening in the center of the inlet end wall, a hydrocarbon injector tube passing through the inlet opening and opening into the inlet end of the combustion chamber coaxially with the combustion chamber, an outlet orifice in the center of the exit end wall having an era equal to from about 5% to about 25% of the cross-sectional area of the combustion chamber normal to the side walls, a reaction chamber in open communication with the combustion chamber through said outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

13. A furnace for the production of carbon black by the thermal decomposition of hydrocarbons comprising a combustion chamber having an inlet end wall, a substantially flat exit end wall and enclosing side walls, in which the distance between the end walls is from about 0.4 to about 1 times the distance between opposing side walls, a plenum chamber for air in back of the inlet end wall, the inlet end wall being formed by a block-like partition positioned between the side walls with its perimeter spaced slightly from the inner surfaces of the side walls forming an annular passage for a combustible mixture of gaseous fuel and air from the plenum chamber into the inlet end of the combustion chamber, a fuel supply pipe in the plenum chamber positioned adjacent to and surrounding the edges of the partition and having a plurality of orifices in its lower surface over its length directed into the space between the edges of the partition and the side walls, an inlet opening in the center of the inlet end wall, a hydrocarbon injector tube passing through the inlet opening and opening into the inlet end of the combustion chamber coaxially with the combustion chamber, an outlet orifice in the center of the exit end wall having an area equal to from about 5% to about 25% of the cross-sectional area of the combustion chamber normal to the side walls, a reaction chamber in open communication with the combustion chamber through said outlet orifice and having a volume equal to from 45% to about 200% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

14. In the process for producing carbon in a furnace having a combustion chamber in which the distance between the end walls is from about 0.25 to about 2 times the distance between opposing side walls and in which the exit end wall has a central outlet orifice of an area equal to from about 5% to about 25% of the cross-sectional area of the combustion chamber normal to the side walls and said orifice leads into a reaction chamber having a cross-sectional area equal to from about 5% to about 100% of the cross-sectional area of the combustion chamber and a volume equal to at least 45% of the volume of the combustion chamber, the method which comprises injecting into the combustion chamber at a plurality of positions around the combustion chamber adjacent the side walls and burning therein a combustible mixture of a gaseous fuel and an oxygen-containing gas in a proportion of from about 90% to about 125% of that required for complete combustion of the gaseous fuel, the combustible mixture being injected at a rate such that the gases forming the combustion gases pass through the combustion chamber at a space velocity of from about 150 to about 600 cubic feet per cubic foot per minute, directing the burning mixture and combustion gases perpendicular to the exit end wall until they impinge on such wall so that the combustion gases become violently turbulent and flow as a turbulent mass to the center of the combustion chamber and to the outlet orifice, simultaneously injecting into the combustion chamber at the inlet end thereof an expanding cone of substantially gaseous hydrocarbon for which the free energy of formation is positive, directing such cone of hydrocarbon axially of the combustion chamber toward the outlet orifice and into the turbulent mass of combustion gases, flowing the resulting mixture of carbon and gases through the outlet orifice and reaction chamber, and separating the carbon from such resulting mixture.

15. In the process for producing carbon in a furnace having a combustion chamber in which the distance between the end walls is from about 0.25 to about 2 times the distance between opposing side walls and in which the exit end wall has a central outlet orifice of an area equal to from about 5% to about 25% of the cross-sectional area of the combustion chamber normal to the side walls and said orifice leads into a reaction chamber having a cross-sectional area equal to from about 5% to about 100% of the cross-sectional area of the combustion chamber and a volume equal to at least 45% of the volume of the combustion chamber, the method which comprises injecting into the combustion chamber at a plurality of positions around the combustion chamber adjacent the side walls and burning therein a combustible mixture of a gaseous fuel and an oxygen-containing gas in a proportion of from about 90% to about 125% of that required for complete combustion of the gaseous fuel, the combustible mixture being injected at a rate such that the gases forming the combustion gases pass through the combustion chamber at a space velocity of from about 160 to about 450 cubic feet per cubic foot per minute, directing the burning mixture and combustion gases perpendicular to the exit end wall until they impinge on such wall so that the combustion gases become violently turbulent and flow as a turbulent mass to the center of the combustion chamber and to the outlet orifice, simultaneously injecting into the combustion chamber at the inlet end thereof an expanding cone of substantially gaseous hydrocarbon for which the free energy of formation is positive, directing such cone of hydrocarbon axially of the combustion chamber toward the outlet orifice and into the turbulent mass of combustion gases, flowing the resulting mixture of carbon and gases through the outlet orifice and reaction chamber, and separating the carbon from such resulting mixture.

16. In the process for producing carbon in a furnace having a combustion chamber in which the distance between the end walls is from about 0.25 to about 2 times the distance between opposing side walls and in which the exit end wall has a central outlet orifice of an area equal to from about 5% to about 25% of the cross-sectional area of the combustion chamber normal to the side walls and said orifice leads into a reaction chamber having a cross-sectional area equal to from about 5% to about 100% of the cross-sectional area of the combustion chamber and a volume equal to at least 45% of the volume of the combustion chamber, the method which comprises injecting into the combustion chamber at a plurality of positions around the combustion chamber adjacent the side walls and burning therein a combustible mixture of a gaseous fuel and an oxygen-containing gas in a proportion of from about 90% to about 125% of that required for complete combustion of the gaseous fuel, the combustible mixture being injected at a rate such that the gases forming the combustion gases pass through the combustion chamber at a space velocity of from about 150 to about 600 cubic feet per cubic foot per minute, directing the burning mixture and combustion gases perpendicular to the exit end wall until they impinge on such wall so that the combustion gases become violently turbulent and flow as a turbulent mass to the center of the combustion chamber and to the outlet orifice, simultaneously injecting into the combustion chamber at the inlet end thereof an expanding cone of substantially gaseous hydrocarbon for which the free energy of formation is positive, directing such cone of hydrocarbon axially of the combustion chamber toward the outlet orifice and into the turbulent mass of combustion gases, the area of the cone of hydrocarbon adjacent the outlet orifice being approximately equal to the area of such orifice, flowing the resulting mixture of carbon and gases through the outlet orifice and reaction chamber, and separating the carbon from such resulting mixture.

17. In the process for producing carbon in a furnace having a combustion chamber in which the distance between the end walls is from about 0.25 to about 2 times the distance between opposing side walls and in which the exit end wall has a central outlet orifice of an area equal to from about 5% to about 25% of the cross-sectional area of the combustion chamber normal to the side walls and said orifice leads into a reaction chamber having a cross-sectional area equal to from about 5% to about 100% of the cross-sectional area of the combustion chamber and a volume equal to at least 45% of the volume of the combustion chamber, the method which comprises injecting into the combustion chamber at a plurality of positions around the combustion chamber adjacent the side walls and burning therein a combustible mixture of a gaseous fuel and an oxygen-containing gas in a proportion of from about 90% to about 125% of that required for complete combustion of the gaseous fuel, the combustible mixture being injected at a rate such that the gases forming the combustion gases pass through the combustion chamber at a space velocity of from about 160 to about 450 cubic feet per cubic foot per minute, directing the burning mixture and combustion gases perpendicular to the exit end wall until they impinge on such wall so that the combustion gases become violently turbulent and flow as a turbulent mass to the center of the combustion chamber and to the outlet orifice, simultaneously injecting into the combustion chamber at the inlet end thereof an expanding cone of substantially gaseous hydrocarbon for which the free energy of formation is positive, directing such cone of hydrocarbon axially of the combustion chamber toward the outlet orifice and into the turbulent mass of combustion gases, the area of the cone of hydrocarbon adjacent the outlet orifice being approximately equal to the area of such orifice, flowing the resulting mixture of carbon and gases through the outlet orifice and reaction chamber, and separating the carbon from such resulting mixture.

18. In the process for producing carbon in a furnace having a combustion chamber in which the distance between the end walls is from about 0.25 to about 2 times the distance between opposing side walls and in which the exit end wall has a central outlet orifice of an area equal to from about 5% to about 25% of the cross-sectional area of the combustion chamber normal to the side walls and said orifice leads into a reaction chamber having a cross-sectional area equal to from about 5% to about 100% of the cross-sectional area of the combustion chamber and a volume equal to at least 45% of the volume of the combustion chamber, the method which comprises injecting into the combustion chamber at a plurality of positions around the combustion chamber adjacent the side walls and burning therein a combustible mixture of a gaseous fuel and an oxygen-containing gas in a proportion of from about 90% to about 125% of that required for complete combustion of the gaseous fuel, the combustible mixture being injected at a rate such that the resulting gases forming the combustion gases pass through the combustion chamber at a space velocity of from about 150 to about 600 cubic feet per cubic foot per minute, directing the burning mixture and combustion gases perpendicular to the exit end wall until they impinge on such wall so that the combustion gases become violently turbulent and flow as a turbulent mass to the center of the combustion chamber and to the outlet orifice, simultaneously injecting into the combustion chamber at the inlet end thereof an expanding cone of hydrocarbon oil for which the free energy of formation is positive in a substantially gaseous form, directing such cone of hydrocarbon oil axially of the combustion chamber toward the outlet orifice and into the turbulent mass of combustion gases, the area of the cone of hydrocarbon oil adjacent the outlet orifice being approximately equal to the area of such orifice, flowing the resulting mixture of carbon and gases through the outlet orifice and reaction chamber, and separating the carbon from such resulting mixture.

19. In the process for producing carbon in a furnace having a combustion chamber in which the distance between the end walls is from about 0.25 to about 2 times the distance between opposing side walls and in which the exit end wall has a central outlet orifice of an area equal to from about 5% to about 25% of the cross-sectional area of the combustion chamber normal to the side walls and said orifice leads into a reaction chamber having a cross-sectional area equal to from about 5% to about 100% of the cross-sectional area of the combustion chamber and a volume equal to at least 45% of the volume of the combustion chamber, the method which comprises injecting into the combustion chamber at a plurality of positions around the combustion chamber adjacent the side walls and burning therein a combustible mixture of a gaseous fuel and an oxygen-containing gas in a proportion of from about 90% to about 125% of that required for complete combustion of the gaseous fuel, the combustible mixture being injected at a rate such that the resulting gases forming the combustion gases pass through the combustion chamber at a space velocity of from about 160 to about 450 cubic feet per cubic foot per minute, directing the burning mixture and combustion gases perpendicular to the exit end wall until they impinge on such wall so that the combustion gases become violently turbulent and flow as a turbulent mass to the center of the combustion chamber and to the outlet orifice, simultaneously injecting into the combustion chamber at the inlet end thereof an expanding cone of hydrocarbon oil for which the free energy of formation is positive in a substantially gaseous form, directing such cone of hydrocarbon oil axially of the combustion chamber toward the outlet orifice and into the turbulent mass of combustion gases, the area of the cone of hydrocarbon oil adjacent the outlet orifice being approximately equal to the area of such orifice, flowing the resulting mixture of carbon and gases through the outlet orifice and reaction chamber, and separating the carbon from such resulting mixture.

20. A furnace for the production of carbon black by the thermal decomposition of hydrocarbons comprising a combustion chamber having an inlet and end wall, a substantially flat exit end wall and enclosing side walls, in which the distance between the end walls is from about 0.25 to about 2 times the distance between opposing side walls, the inlet end wall being formed by a block-like partition positioned between the side walls with its perimeter spaced slightly from the inner surfaces of the side walls forming an annular passage for a combustible mixture of gaseous fuel and air into the inlet end of the combustion chamber, burner means positioned adjacent to and surrounding the edges of the partition rearwardly of the inlet end of the combustion chamber and directed into the annular passage between the edges of the partition and the side walls perpendicularly toward the exit end wall of the combustion chamber, an inlet opening in the center of the inlet end wall, a hydrocarbon injector tube passing through the inlet opening and opening into the inlet end of the combustion chamber coaxially with the combustion chamber, an outlet orifice in the center of the exit end wall having an area equal to from about 5% to about 25% of the cross-sectional area of the combustion chamber normal to the side walls, a reaction chamber in open communication with the combustion chamber through said outlet orifice and having a volume equal to at least 45% of the volume of the combustion chamber and a cross-sectional area equal to from about 5% to about 100% of the cross-sectional area of the combustion chamber and at least equal to the area of the outlet orifice, and carbon collecting means connected with the exit end of the reaction chamber.

IRA WILLIAMS.

REFERENCES CITED

The following references are of record in the file of this patent:

UNITED STATES PATENTS

| Number | Name | Date |
|---|---|---|
| 2,039,981 | Rembert | May 5, 1936 |
| 2,163,630 | Reed | June 27, 1939 |
| 2,292,355 | Ayers | Aug. 11, 1942 |
| 2,368,827 | Hanson et al. | Feb. 6, 1945 |
| 2,375,795 | Krejci | May 15, 1945 |
| 2,419,565 | Krejci | Apr. 29, 1947 |
| 2,499,438 | Wiegand et al. | Mar. 7, 1950 |
| 2,564,700 | Krejci | Aug. 21, 1951 |